(12) United States Patent
Molnar et al.

(10) Patent No.: US 7,508,397 B1
(45) Date of Patent: Mar. 24, 2009

(54) RENDERING OF DISJOINT AND OVERLAPPING BLITS

(75) Inventors: Steven E. Molnar, Chapel Hill, NC (US); Justin Legakis, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 335 days.

(21) Appl. No.: 10/985,690

(22) Filed: Nov. 10, 2004

(51) Int. Cl.
G09G 5/36 (2006.01)
G06T 1/20 (2006.01)
G06F 12/00 (2006.01)

(52) U.S. Cl. .................. 345/562; 345/505; 345/506; 345/537; 345/563; 345/564; 711/168; 711/169

(58) Field of Classification Search .................. None
See application file for complete search history.

(56) References Cited

U.S. PATENT DOCUMENTS

| | | | |
|---|---|---|---|
| 6,457,098 B1 * | 9/2002 | DeKoning et al. | 711/114 |
| 6,507,898 B1 * | 1/2003 | Gibson et al. | 711/168 |
| 2003/0041163 A1 * | 2/2003 | Rhoades et al. | 709/232 |
| 2003/0126353 A1 * | 7/2003 | Satoh et al. | 711/100 |
| 2003/0160796 A1 * | 8/2003 | Lavelle et al. | 345/557 |

* cited by examiner

Primary Examiner—Hyung S Sough
Assistant Examiner—Kaushikkumar Patel
(74) Attorney, Agent, or Firm—Townsend and Townsend and Crew LLP

(57) ABSTRACT

Methods, apparatuses, and systems are presented for modifying data in memory associated with an image, involving processing data operations in a pipelined process affecting data in memory corresponding to the image. The data operations include a first data operation involving a first read operation followed by a first write operation, and a second data operation involving a second read operation followed by a second write operation. After starting the first read operation, a determination is made whether data associated with the first data operation overlaps with data associated with the second data operation. If a data overlap occurs, the second read operation is started after the first write operation is completed, and if no data overlap occurs, the second read operation is started before the first write operation is completed.

18 Claims, 4 Drawing Sheets

RENDERING OF DISJOINT AND OVERLAPPING BLITS

BACKGROUND OF THE INVENTION

Efficient modification of data in memory relevant to display rendering plays a central role in the determining the performance of graphics processing operations. Data stored in a designated portion of memory may correspond directly with pixels associated with an image. For example, if 32 bits of data are used to represent each pixel in the image, each pixel may correspond with four bytes of storage within the designated memory space. A rectangular image region that is 1400 pixels by 1050 pixels, for instance, would occupy 5.88 Megabytes of memory storage. The data in memory corresponding to each pixel may be used to represent one or more values, such as color values, depth values, stencil values, opacity values, etc., associated with that pixel. By modifying the associated data stored in the designated memory space, the image itself may be correspondingly modified. Here, the term "pixel" is used in a general sense to refer to an elemental unit of an image. In some cases, the image may be presented to a viewer on a display device. In other cases, the image may not be directly displayed at all to any viewer. For example, texture mapping involves the application of a two-dimensional surface onto a three dimensional object. This process may be analogized as "wallpapering" or "tiling" the two-dimensional surface onto the three-dimensional object. The two-dimensional surface is composed of units commonly referred to as "texels," and the collection of texels making up the two-dimensional surface is of commonly referred to as a texture bitmap. Thus, an example of an image referred to here may include a texture bitmap. Also an example of a pixel may include a texel that is part of a texture bit map.

FIG. 1 is a block diagram of an illustrative computer system 100 capable of modifying data in memory corresponding to an image. As shown, computer system 100 includes a graphics card 102, a central processing unit (CPU) 104, a chipset comprising a northbridge chip 106 and a southbridge chip 108, system memory 110, PCI slots 112, disk drive controller 114, universal serial bus (USB) connectors 116, audio CODEC 118, a super I/O controller 120, and keyboard controller 122. As shown in FIG. 1, graphics card 102 includes a graphics processing unit (GPU) 124 and local memory 126. Also, graphics card 102 is connected to a display 128 that may be part of computer system 100. Here, GPU 124 is a semiconductor chip designed to perform graphics processing operations associated with rendering an image that may be presented on display 128.

A portion of memory space in local memory 126 may be used to correspond to a particular image such as a screen area on display 128. Thus, data stored at certain storage locations in the portion of memory may be modified, in order to effectuate changes to corresponding pixel areas within the image. This may occur in real time such that a viewer would nearly instantaneously see the changes occur to the corresponding pixels areas on display 128. The coordination of which memory locations in local memory 126 to modify and the carrying out of those modifications, to effectuate the desired changes to the corresponding image, may be handled by GPU 124. Alternatively or additionally, system memory 110 may also be used to correspond to a particular image such as a screen area on display 128. Thus, certain storage locations in a portion of memory in memory 110 may be modified, in order to effectuate changes to corresponding pixel areas within a particular image. Again, GPU 124 may handle the coordination of which memory locations to modify and the carrying out of those modifications, to effectuate the desired changes to the corresponding image. Here, data and control signals may need to traverse greater distances in computer system 100, such as through north bridge chip 106. Thus, use of system memory 110 for storing data corresponding to an image may involve longer delays than use of local memory 126. GPU 124 is described here merely as an example of equipment used to perform graphics and memory operations. Such operations may be performed by other types of equipment, such as a general purpose processor, field programmable gate array (FPGA), application-specific integrated circuit (ASIC) and/or others. Computer system 100 and its components shown in FIG. 1 is presented here simply for illustrative purposes.

GPU 124 may modify data in memory corresponding to an image in a variety of different ways. For example, such memory modifications may be performed one pixel at a time. That is, for an image represented by a group of pixels within an image, it is possible to make a modification to the image by issuing instructions to GPU 124 to modify data in memory corresponding to each pixel. Also, memory modifications may be made one pixel area at a time. Here, for an image represented by a group of pixels within an area, such as a rectangular pixel area, it may be possible to make a modification to the image by issuing a single instruction to GPU 124 to modify data in memory corresponding to the pixel area. For example, a BLIT operation copies a source pixel area to a destination pixel area in the image. GPU 124 may respond to an instruction to perform a BLIT operation by performing a read operation to read data in memory locations corresponding to the source pixel area, followed by a write operation to write that data to memory locations corresponding to the destination pixel area. The instruction for a BLIT operation may specify coordinates to identify the source pixel area, as well as coordinates to identify the location of the destination pixel area. Of course, there may be variations in the manner in which such parameters are specified.

Operations such as BLITs have traditionally been conducted in a purely serial manner. For example, a BLIT operation would be not be allowed to start until all previous BLIT operations have completed. Because the source of one BLIT operation may depend on the destination of a prior BLIT operation, such serial execution has been adopted to prevent errors in the sequencing of read and write operations for multiple BLIT operations. However, these read and write operations may require relatively large amounts of time to complete. As a result, purely serial execution of BLIT operations can be highly inefficient. What is needed is a technique for processing operations such as BLITs in a more parallel fashion, without incurring errors in the proper sequencing of associated read and write operations. Such an enhancement would have a significant and positive impact on the performance of graphics systems.

BRIEF SUMMARY OF THE INVENTION

The present invention relates to methods, apparatuses, and systems for modifying data in memory associated with an image, involving processing a plurality of data operations in a pipelined process affecting data stored in a portion memory corresponding to the image, the plurality of data operations including a first data operation involving a first read operation followed by a first write operation and a second data operation involving a second read operation followed by a second write operation, starting the first read operation, determining whether data associated with the first data operation overlaps with data associated with the second data operation, if data associated with the first data operation overlaps with data associated with the second data operation, starting the second read operation after the first write operation is completed, and if the data associated with the first data operation does not overlap with data associated with the second data operation, starting the second read operation before the first write operation is completed.

In one embodiment of the invention, determining whether data associated with the first data operation overlaps with data associated with the second data operation involves determining whether a destination pixel area associated with the first write operation overlaps with a source pixel area associated with the second read operation. In another embodiment, determining whether data associated with the first data operation overlaps with data associated with the second data operation involves determining whether a destination memory range associated with the first write operation overlaps with a source memory range associated with the second read operation.

Each of the first data operation and the second data operation may be a BLIT operation. The second read operation may be started before completion of the first write operation by processing the first read operation and the second read operation in a pipeline. A feedback signal may be generated indicating completion of the first write operation.

The first and second read operations may involve reading data from memory corresponding to a first and a second source pixel area in the image, and wherein the first and second write operations involve writing data to memory corresponding to a first and a second destination pixel area in the image. The first source pixel area may have identical dimensions as the first destination pixel area, and the second source pixel area may have identical dimensions as the second destination pixel area. Further, each of the first source pixel area, first destination pixel area, second source pixel area, and second destination pixel area may have a rectangular shape.

Also, determining whether data associated with the first data operation overlaps with data associated with the second data operation may involve maintaining a list of data operations, including the first data operation, for which a read operation has started but a write operation has not completed, and determining whether data associated with any data operation in the list of data operations overlaps with data associated with the second data operation.

DETAILED DESCRIPTION OF THE INVENTION

Figure 1:
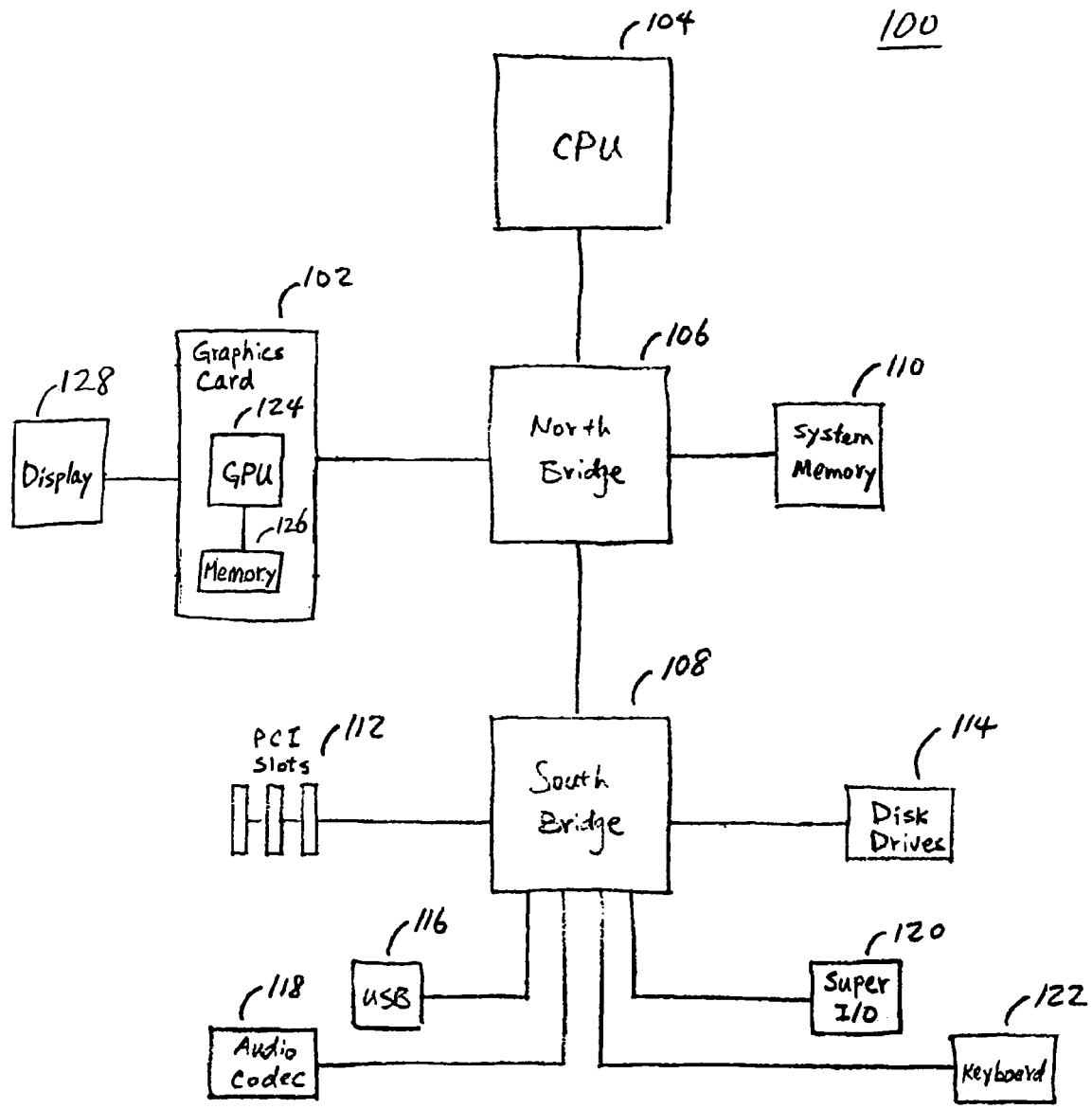
FIG. 1 is a block diagram of an illustrative computer system 100 capable of modifying data in memory corresponding to display rendering.
Figure 2:
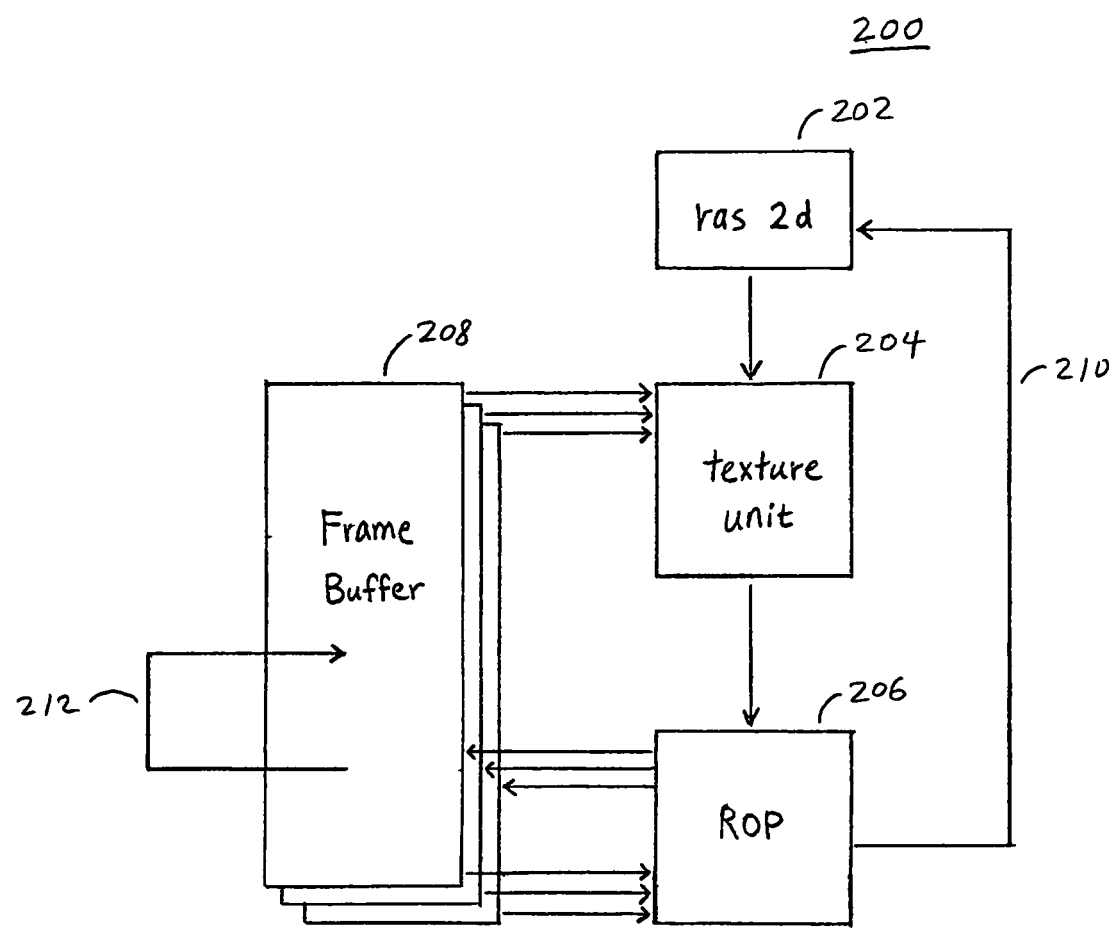
FIG. 2 is a block diagram including basic components within a graphics processing unit (GPU) 200 in accordance with one embodiment of the present invention.

FIG. 2 is a block diagram including basic components within a graphics processing unit (GPU) 200 in accordance with one embodiment of the present invention. GPU 200 may be utilized in a computer system to perform graphics processing, such as in an arrangement comparable to that of GPU 124 in computer system 100 shown in FIG. 1. As shown in FIG. 2, GPU 200 includes a two-dimensional rasterizer module 202, a texture unit 204, and a raster operations unit 206. Also shown in this figure is frame buffer 208. Here, frame buffer 208 represents memory that may be used as a designated portion of memory corresponding to pixels within a particular image. Frame buffer may be implemented in memory residing in GPU 200, memory residing outside GPU 200 such as local memory 126 on graphics card 102 shown in FIG. 1, and/or other memory residing within a computer system such as system memory 110 shown in FIG. 1. According to the present embodiment of the invention, two-dimensional rasterizer module 202, texture unit 204, and raster operations unit 206 work together to effectuate modifications to data in frame buffer 208 corresponding to an image in an efficient manner.

Specifically, these components may carry out multiple data operations in a pipelined manner. Generally speaking, pipelining allows a data operation to begin before the completion of a previous data operations. For example, GPU 200 may be able to carry out a number of BLIT operations, each of which involving reading and writing of data in frame buffer 208 corresponding to the copying image data from a source pixel area to a destination pixel area in the image, according to a pipelined process. Here, rasterizer module 202 sends controls signals, such as coordinates identifying source and destination pixel areas, to texture unit 204 to begin a BLIT operation. Texture unit 204 operates to read data from memory locations corresponding to the specified source pixel area. Texture unit 204 then passes the data to raster operations unit 206. Raster operations unit 206 writes the appropriate data to memory locations corresponding to the specified destination pixel area to complete the BLIT operation. According to the present embodiment of the invention, GPU 200 may pipeline data operations such that rasterizer module 202 may send control signals to texture unit 202 to start a new BLIT operation, and texture unit may respond by starting to read data from memory location in frame buffer 208 corresponding to a source pixel area for the new BLIT operation, before one or more previous BLIT operations is completed. Upon completion of each BLIT operation, which may be designated as the completion of a write operation to write the appropriate data to memory locations in frame buffer 208 corresponding to destination the pixel area for the BLIT operation, raster operation unit 206 may send a feedback signal 210 to rasterizer module 202 to indicate that the BLIT has completed.

The rasterizer module 202, texture unit 204, raster operation unit 206, and frame buffer 208 are described here for purposes of illustration. The specific names rasterizer module, texture unit, raster operation unit, and frame buffer are chosen for this specific embodiment of the invention. Other types and arrangements of component(s) may be used to carrying out data operations described herein in accordance with the present invention. Such components need not have names corresponding to names chosen here for components 202, 204, 206, and 208.

Alternatively or additionally, a feedback signal 212 may be sent from one point to another point within frame buffer 208. Feedback signal 212 is shown in FIG. 2 as exiting frame buffer 208 and re-entering frame buffer 208. However, feedback signal 212 may be implemented as a signal that does not exit the memory device holding frame buffer 208. Also, frame buffer 208 may represent a memory device of a portion thereof that is capable of operations in addition to reading and writing of data. For example, the memory device may be capable of utilizing feedback signal 212 in accordance with the present embodiment of the invention. Use of feedback signal 212 is described in further detail in later sections.

Figures 3A, 3B, 3C:
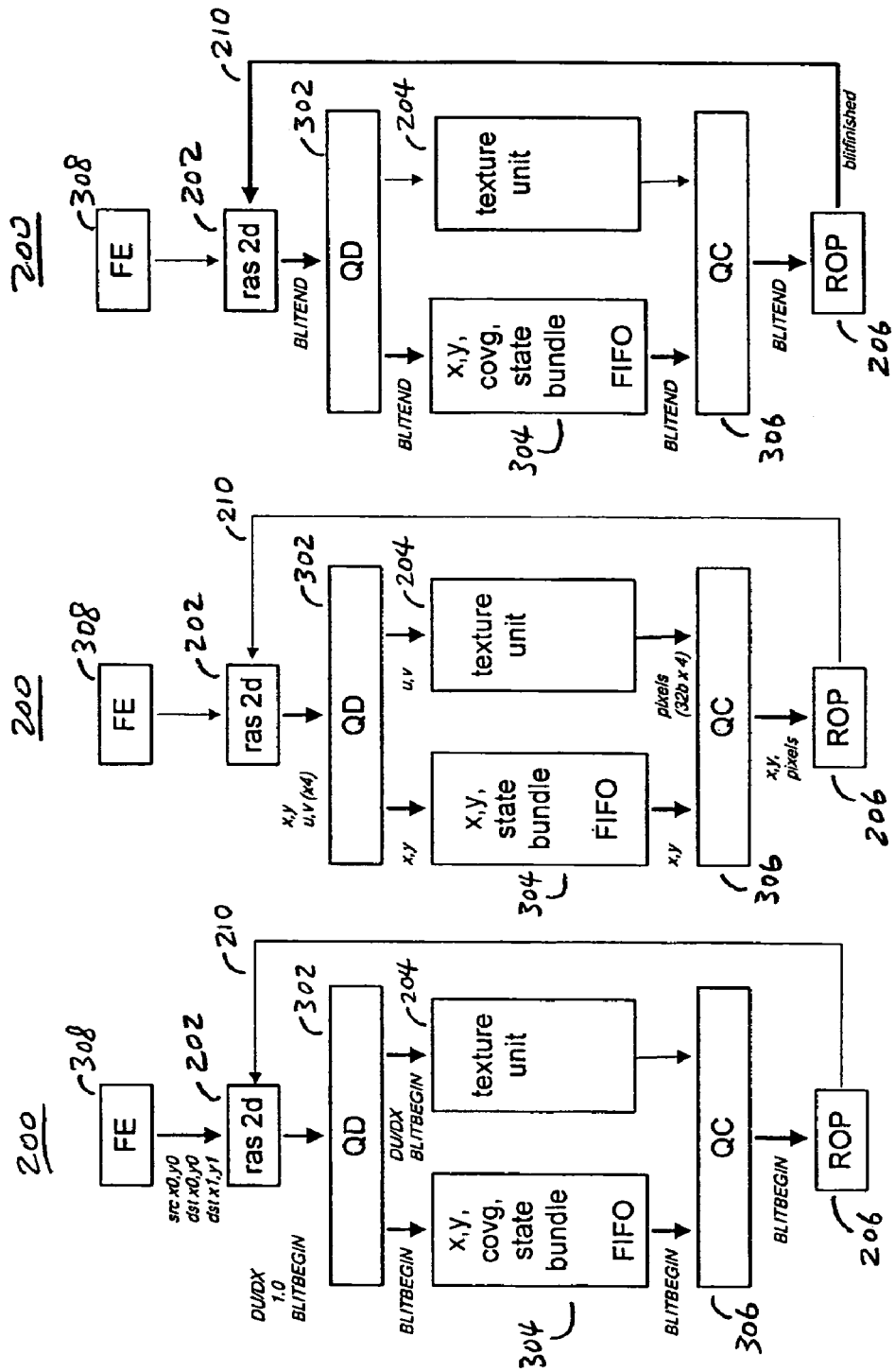
FIG. 3a is a more detailed block diagram of GPU 200 illustrating the start of a BLIT operation in accordance with one embodiment of the present invention.
FIG. 3b is a more detailed block diagram of GPU 200 illustrating the processing of a BLIT operation in accordance with one embodiment of the present invention.
FIG. 3c is a more detailed block diagram of GPU 200 illustrating the end of a BLIT operation in accordance with one embodiment of the present invention.

FIG. 3a is a more detailed block diagram of GPU 200 illustrating the start of a BLIT operation in accordance with one embodiment of the present invention. In this figure, GPU 200 is shown to include two-dimensional rasterizer module 202, texture unit 204, and raster operations unit 206. In addition, GPU 200 is shown to include a quad distributor 302, a first-in-first-out (FIFO) module 304, and a quad collector 306. A feedback signal 210 is shown as being sent from raster operation unit 206 to raster module 202. A front end 308 is also shown in this figure to represent equipment and/or functions that may communicate with GPU 200 and utilize GPU 200 to perform graphics processing.

The quad distributor 302, first-in-first-out module 304, quad collector 306, and front end 308 are described here for purposes of illustration. The specific names quad distributor, first-in-first-out module, quad collector, and front end are chosen for this specific embodiment of the invention. Other types and arrangements of component(s) may be used to carrying out data operations described herein in accordance with the present invention. Such components need not have names corresponding to names chosen here for components 302, 304, 306, and 308.

GPU 200 may perform a BLIT operation as a sequence of smaller, sub-BLIT operations, where each sub-BLIT operation involves reading, conveying, and writing smaller quantities of data. The amount of data read, transferred, and written in a sub-BLIT operation may be chosen to match the efficient read or write granularity of the memory system. In the present embodiment, each sub-BLIT operation has a source pixel area containing four quads and a destination pixel area containing four quads. As used here, a quad is a unit that refers to a group of four pixels. In one implementation, each quad corresponds to a 2×2-pixel area, and the source pixel area and destination pixel area each corresponds to a 4×4-pixel area. In another implementation, each quad corresponds to a 1×4 pixel area, and the source pixel area and destination pixel area each corresponds to a 1×16-pixel area. If each pixel comprises 32 bits (4 bytes) of data, each sub-BLIT operation involves the reading of 64 bytes of data and the writing of 64 bytes of data. The particular dimensions and parameters mentioned above may differ in other implementations.

While each BLIT operation is described here as being performed as a sequence of smaller, sub-BLIT operations, the invention is not necessarily limited to this specific embodiment. Thus, the disclosure below refers to BLIT operations generally, whether implemented using sub-BLIT operations or by other means.

Source pixel areas may be required to be aligned and destination pixel areas may be required to be aligned. If alignment is required, at the boundary of a BLIT, an entire source pixel area may need to be read even if only a subset of the pixels in the source pixel are needed. Similarly, at the boundary of a BLIT an entire destination pixel area may need to be written, even if only a subset of the pixels in the destination pixel area need to be updated. Such selective updates may be accomplished using writes with byte enables, a read-modify-write, or other method familiar to those skilled in the art. Because of the relative alignment of the source and destination rectangles, data from multiple source pixel areas may need to be combined to form the data for one destination pixel area. The present embodiment uses the texture cache to store data from source pixel read operations and make them available to the multiple destination pixel area writes that may need them.

Front end 306 may specify a source pixel area and a destination pixel area for a BLIT operation to rasterizer module 202. Here, front end represents higher level equipment and/or functions such as a CPU executing an application program requiring graphics processing in a computer system.

Rasterizer unit 202 receives information specifying the source pixel area and destination pixel area for the BLIT operation and starts the BLIT operation. Rasterizer unit 202 sends a DU/DX value and a BLITBEGIN value to SQD 302. The DU/DX value represents a scaling factor to be applied in the relevant data operation. As shown in FIG. 3a, a scaling of 1.0 (no scaling) is applied in the present embodiment of the invention because the dimensions of the destination pixel area is assumed here to be identical to the dimensions of the source pixel area. The BLITBEGIN value instructs quad distributor 302 to start the BLIT operation. Here, the BLITBEGIN value may actually be a bundle of one or more values related to the current BLIT operation.

Quad distributor 302 distributes the current BLIT operation to a pipelined process. That is, the current BLIT operation may be started prior to the completion of one or more previous BLIT operations that have been started but have not been completed. Here, a part of the process to start the current BLIT operation, quad distributor 302 passes the DU/DX value and the BLITBEGIN value to texture unit 204.

FIFO 304 stores parameters associated with destination pixel areas for one or more BLIT operations being processed. These parameters are discussed in further detail in sections below. Here, as part of the process to start the current BLIT operation, the BLITBEGIN value is simply passed to the FIFO module 304. Correspondingly, FIFO module 304 passes the BLITBEGIN value to quad collector 306.

Texture unit 204 performs read operations from memory locations corresponding to source pixel areas associated with BLIT operations. Here, as part of the process to start the current BLIT operation, texture unit 204 receives the DU/DX value and BLITBEGIN value associated with the current BLIT operation.

Quad collector 306 pairs x and y coordinates for a particular BLIT operation with the corresponding pixel data read from memory for the BLIT operation. Here, as part of the process to start the current BLIT operation, quad collector 306 simply receives the BLITBEGIN value from FIFO module 306 and passes the BLITBEGIN value to raster operation unit 206.

Raster operation unit 206 performs write operations to memory locations corresponding to destination pixel areas associated with BLIT operations. Here, as part of the process to start the current BLIT operation, Raster operation unit 206 receives the BLITBEGIN value associated with the current BLIT operation.

FIG. 3b is a more detailed block diagram of GPU 200 illustrating the processing of a BLIT operation in accordance with one embodiment of the present invention. GPU 200 is shown in FIG. 3b to include two-dimensional rasterizer module 202, texture unit 204, and raster operations unit 206, quad distributor 302, first-in-first-out (FIFO) module 304, and a quad collector 306, as was the case in FIG. 3a. Also, feedback signal 210 and front end 308 are again illustrated.

Here, rasterizer unit 202 drives the BLIT operation. As shown in FIG. 3a, rasterizer unit 302 receives information specifying the source pixel area and destination pixel area for the current BLIT operation from front end 308. Rasterizer determines whether the current BLIT operation conflicts with any "in-flight" BLIT operations, that is, BLIT operations that have started but not yet been completed. If the current BLIT operation is in conflict with an "in-flight" BLIT operation, rasterizer unit 302 waits for the conflicting "in-flight" BLIT operation to complete before allowing the current BLIT operation to proceed. If the current BLIT operation is not in conflict with any "in-flight" BLIT operation, rasterizer unit may allow the current BLIT operation to proceed by sending parameters associated with the current BLIT operation to quad distributor 302. According to the present embodiment of the invention, rasterizer unit 202 determines whether the current BLIT operation conflicts with any "in-flight" BLIT operations by comparing coordinate values specifying the location of source and/or destination pixel areas of the current BLIT operation with those of "in-flight" BLIT operations.

In the present embodiment of the invention, a BLIT operation may be considered to be "in-flight" if a read operation for reading data from memory location(s) corresponding to the source pixel area of the BLIT operation has started, all write operations for writing data to memory location(s) corresponding to the destination pixel area of the BLIT operation have not been completed. Furthermore, the current BLIT operation may be considered to be in conflict with an "in-flight" BLIT operation if the destination pixel area of the "in-flight" BLIT operation overlaps or potentially overlaps with the source pixel area of the current BLIT operation.

Figure 4A:
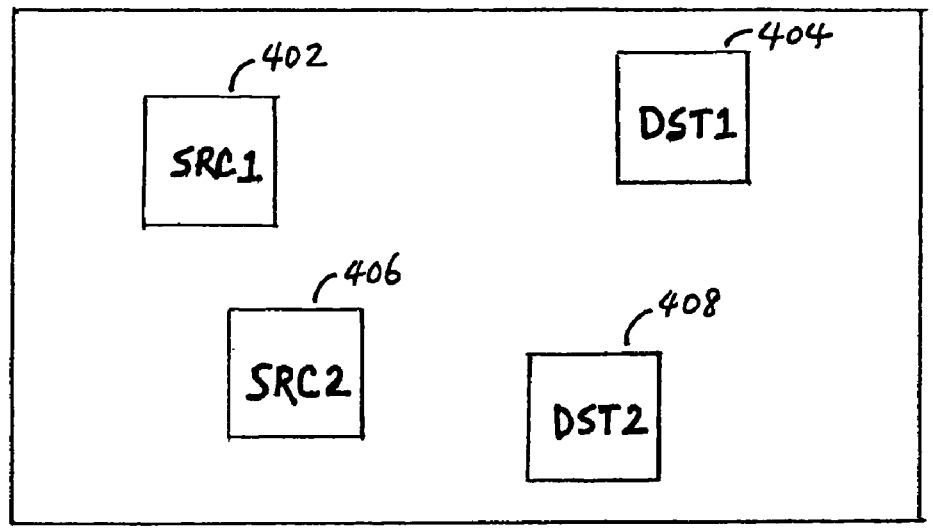
FIG. 4a provides an example of two BLIT operations that may be considered to be not in conflict in one embodiment of the present invention.

FIG. 4a provides an example of two BLIT operations that may be considered to be not in conflict in one embodiment of the present invention. As shown, a particular BLIT operation may involve the copying of data in memory location(s) corresponding to source pixel area 402 to memory location(s) corresponding to destination pixel area 404. Another BLIT operation may involve the copying of data in memory location(s) corresponding to source pixel area 406 to memory location(s) corresponding to destination pixel area 408. The dimensions of source pixel area 402 is assumed to be identical to the dimensions of destination pixel area 404 to simplify illustration in this figure. Similarly, the dimensions of source pixel area 406 is assumed to be identical to the dimensions of destination pixel area 408. As illustrated in this figure, the two BLIT operations do not conflict with one another. Regardless of whether one BLIT operation is intended to be processed before the other, the BLIT operations may be carried out without concern that the two BLIT operations could conflict with one another.

Figure 4B:
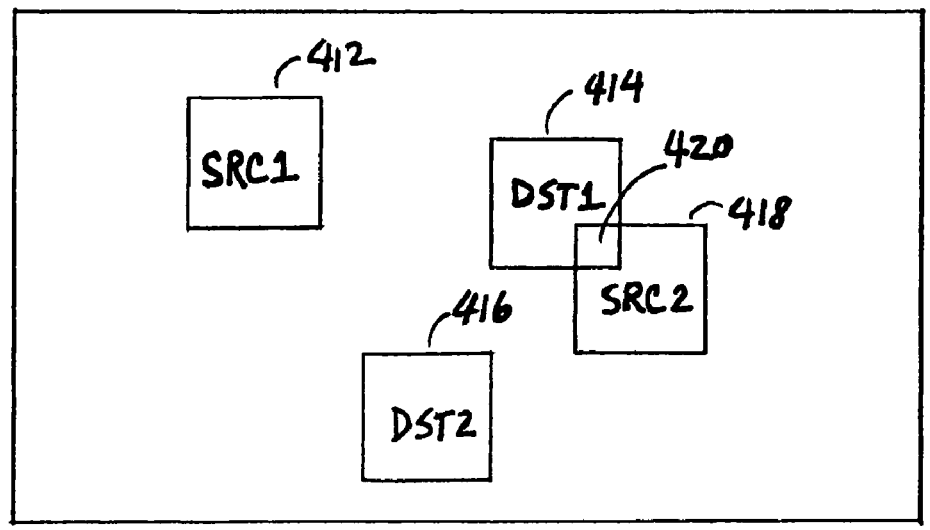
FIG. 4b provides an example of two BLIT operations that may be considered to be in conflict in one embodiment of the present invention.

FIG. 4b provides an example of two BLIT operations that may be considered to be in conflict in one embodiment of the present invention. As shown, a particular BLIT operation may involve the copying of data in memory location(s) corresponding to source pixel area 412 to memory location(s) corresponding to destination pixel area 414. Another BLIT operation may involve the copying of data in memory location(s) corresponding to source pixel area 416 to memory location(s) corresponding to destination pixel area 418. The dimensions of source pixel area 412 is assumed to be identical to the dimensions of destination pixel area 414 to simplify illustration in this figure. Similarly, the dimensions of source pixel area 416 is assumed to be identical to the dimensions of destination pixel area 418. As illustrated in this figure, the two BLIT operations do conflict with one another. For example, if the BLIT operation associated with source pixel area 412 and destination pixel area 414 is intend to be processed prior to the BLIT operation associated with source pixel area 416 and destination pixel area 416, an overlap region 420 may cause error in the BLIT process. That is, if the previous BLIT operation has not completed the process of writing appropriate data to memory location(s) associated with destination pixel area 414 by the time the later BLIT operation reads data from memory location(s) associated with source pixel area 418, incorrect data may be read corresponding to the overlap region 420. A situation such as that illustrated in FIG. 4b may occur, for example, if multiple BLIT operations are pipelined such that a current BLIT operation has the potential of starting before one or more "in-flight" BLIT operations which conflict with the current BLIT operation are completed.

Returning to FIG. 3b, if the current BLIT operation does not conflict with any "in-flight" BLIT operations, or upon completion of all "in-flight" BLIT operations that conflict with the current BLIT operation, rasterizer unit 202 sends parameters associated with the current BLIT operation to quad distributor 302. These parameter include x and y coordinates specifying the destination pixel area, u and v coordinates specifying the source pixel area for the current BLIT operation. Here, x and y coordinates may identify the screen location of the top left pixel of the destination pixel area. The u and v coordinates may comprise four sets of u and v coordinates, each set identifying a quad (four-pixels) of the source pixel area. According to the present embodiment of the invention, the BLIT operation may involve a pixel area that is a linear surface comprising four quads arranged in a horizontal row (a 64-byte by 1-pixel block). Alternatively, the BLIT operation may involve a pixel area that is a tiled surface comprising four quads stacked vertically (a 16-byte by 4-pixel block). Thus, the u and v coordinates for the current BLIT operation may comprise four sets of u and v coordinates identifying the four quads associated with the source pixel area. Note that only a pair of x and y coordinates identifying the screen location of the top pixel of the destination pixel area is required to be specified here. This is possible because in the present embodiment of the invention, the dimensions of destination pixel area are assumed to be identical to the dimensions of the source pixel area in the present embodiment of the invention, and therefore specification of the location of the top left pixel of the destination pixel area suffices to identify the location of the destination pixel area. In another embodiment of the invention, additional pairs of x and y coordinates may be specified. In yet another embodiment of the invention, the previously described DU/DX value, representing a scaling factor used, may be used to calculate additional pairs of x and y coordinates.

Quad distributor 302 receives the x and y coordinates and the u and v coordinates associated with the current BLIT operation and distributes the current BLIT operation to a pipelined process by which the current BLIT operation may be started prior to the completion of one or more previous BLIT operations that have been started but have not been completed. In other words, the current BLIT operation may start while other BLIT operations are "in-flight." Quad distributor does this by forwarding the x and y coordinates associated with the destination pixel area of the current BLIT operation to FIFO module 304 and forwarding u and v coordinates associated with the source pixel area of the current BLIT operation to texture unit 204.

FIFO module 304 receives the x and y coordinates associated with the destination pixel area of the current BLIT operation and stores them in its first-in-first-out storage arrangement. Thus, FIFO module 304 may hold the x and y coordinates associated with destination pixel areas of a number of "in-flight" BLIT operations. Thus, the x and y coordinates associated with the pixel area of the current BLIT operation pass through FIFO module 304, and when these x and y coordinates are needed, they are passed to quad collector 306.

Texture unit 204 receives the u and v coordinates associated with the source pixel area of the current BLIT operation and proceeds to read data from memory locations in the frame buffer (not shown) corresponding to the source pixel area of the current BLIT operation. This read operation may be pipelined with other read operations, such as those of other BLIT operations already "in-flight." Depending on the implementation, each read operation may require significant amount of time to complete, and therefore these read operations may be deeply pipelined such that in the time span in which a particular read operation starts and completes, numerous subsequent read operations may be started. Also, in the same time span, numerous previous read operations may be completed. Once texture unit 204 completes the read operation for reading data from memory corresponding to the source pixel area of the current BLIT operation, the data is passed to quad collector 306.

Quad collector 306 pairs the x and y coordinates associated with the destination pixel area of the current BLIT operation with the data read from memory associated the source pixel area of the current BLIT operation. Quad collector 306 then sends the paired information to rasterizer operation unit 206.

Raster operation unit 206 receives this paired information and writes the data read from memory associated with the source pixel area of the current BLIT operation to memory location(s) within the frame buffer (not shown) corresponding to the appropriate destination pixel area, as identified by the x and y coordinates for the current BLIT operation.

FIG. 3c is a more detailed block diagram of GPU 200 illustrating the end of a BLIT operation in accordance with one embodiment of the present invention. GPU 200 is shown in FIG. 3c to include two-dimensional rasterizer module 202, texture unit 204, and raster operations unit 206, quad distributor 302, first-in-first-out (FIFO) module 304, and a quad collector 306, as was the case in FIGS. 3a and 3b. Also, feedback signal 210 and front end 308 are again illustrated.

Rasterizer unit 202 sends a BLITEND value, at the end of all the commands and data associated with a BLIT operation, to quad distributor 302. Here, the BLITEND value may actually be a bundle of one or more values related to the BLIT operation being completed. The BLITEND value travels through the pipeline after the commands and data associated with the BLIT operation. Thus, quad distributor 302 performs any necessary completion tasks it may have and passes the BLITEND value to FIFO module 304. FIFO module 304 performs any completion tasks it may have and passes the BLITEND value to quad collector 306. Finally, quad collector 306 performs any necessary completion tasks that it may have to complete the current BLIT operation. Quad collector 306 then passes the BLITEND value to raster operations unit 206.

Upon receiving the BLITEND value, raster operation unit 206 sends a bitfinished signal as feedback signal 210 to rasterizer unit 202. Since all BLIT operations are pipelined in the present embodiment of the invention, raster operation unit 206 does not need to expressly identify which BLIT operation has finished. Raster unit 202 can assume that that all BLIT operations will finish in the same order in which they were issued. Thus, upon receiving the bitfinished signal, raster unit 202 simply removes the oldest entry from its list of "in-flight" BLIT operations. In this manner, rasterizer unit 202 keeps track of which BLIT operations have not yet completed and are therefore still "in-flight." This information is used by rasterizer unit 202 to maintain an up-to-date account of which BLIT operations are "in-flight." Thus, rasterizer unit 202 is able to determine for any particular BLIT operation as it is first processed by rasterizer unit 202, whether that BLIT operation conflicts with any "in-flight" BLIT operations, as previously described.

According to another embodiment of the present invention, control of the pipelined process for handling BLIT operations may be placed closer to the memory device. For example, some component other than rasterizer unit 202 may be placed within or in close proximity to the memory device(s) that hold memory corresponding to an image. Such a component may then determine whether the current BLIT operation conflicts with any "in-flight" BLIT operations. Specifically, the component may determine whether the read operation for reading from memory location(s) associated with the source pixel area of the current BLIT operation overlaps with memory location(s) associated with destination pixel areas of any "in-flight" BLIT operations for which write operations have not yet been completed. Here, the address ranges of the relevant memory location(s) may be compared. According to this embodiment of the invention, instead of comparing coordinate values specifying the location of source and/or destination pixel areas of the current BLIT operation to those of "in-flight" BLIT operations, the component may directly compare memory location addresses which correspond to the source and/or destination pixel areas of the current BLIT operation to those of "in-flight" BLIT operations.

As shown in FIG. 2, instead of feedback signal 210, a feedback signal 212 indicating completion of a particular BLIT operation, such as the completion of a write operation writing data to memory associated with a destination pixel area, may be sent from one component to another component either within the memory device or in close proximity to the memory device. While feedback signal 212 is shown in the figure as exiting frame buffer 208, this feedback signal may be communicated completely within a memory device holding frame buffer 208.

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. A method for modifying data in memory associated with an image comprising:

processing a plurality of data operations in a graphics pipeline, wherein the plurality of data operations are configured to modify data stored in a portion memory corresponding to the image, the plurality of data operations including a first data operation involving a first read operation followed by a first write operation and a second data operation involving a second read operation followed by a second write operation, wherein each of the first data operation and the second data operation is a BLIT operation;

dividing the first read operation into a first set of read sub-operations, wherein each read sub-operation reads a subset of data associated with the first read operation, wherein a size of the subset of data associated with each of the first set of read sub-operations is determined at least in part by read granularity of the memory, write granularity of the memory or a combination thereof, and wherein the first write operation further comprises writing the subset of data read by each read sub-operation of the first set of read sub-operations;

dividing the second read operation into a second set of read sub-operations, wherein each read sub-operation reads a subset of data associated with the second read operation, wherein a size of the subset of data associated with each of the second set of read sub-operations is determined at least in part by read granularity of the memory, write granularity of the memory or a combination thereof, and wherein the second write operation further comprises writing the subset of data read by each read sub-operation of the second set of read sub-operations;

starting the first read operation, wherein starting the first read operation further comprises:
  inserting the first set of read sub-operations into the graphics pipeline; and
  beginning execution of at least one read sub-operation from the first set of read sub-operations;

determining whether data associated with the first data operation overlaps with data associated with the second data operation, wherein the determining step comprises determining whether a destination pixel area associated with the first write operation overlaps with a source pixel area associated with the second read operation, wherein determining whether an overlap occurs includes translating the coordinates of the destination pixel area associated with the first write operation to a first range of memory addresses and translating the source pixel area associated with the second read operation to a second range of memory addresses, and wherein an overlap occurs if the first range of memory addresses overlaps the second range of memory addresses;

if data associated with the first data operation overlaps with data associated with the second data operation, starting the second read operation after the first write operation is completed; and if the data associated with the first data operation does not overlap with data associated with the second data operation, starting the second read operation before the first write operation is completed, wherein starting the second read operation further comprises:
  inserting the second set of read sub-operations into the graphics pipeline; and
  beginning execution of at least one read sub-operation from the second set of read sub-operations.

2. The method of claim 1 wherein the determining step comprises determining whether a destination memory range associated with the first write operation overlaps with a source memory range associated with the second read operation.

3. The method of claim 1 wherein the second read operation is started before completion of the first write operation by processing the first read operation and the second read operation in a pipeline.

4. The method of claim 1 further comprising a step of generating a feedback signal indicating completion of the first write operation.

5. The method of claim 1 wherein the first and second read operations involve reading data from memory corresponding to a first and a second source pixel area in the image, and wherein the first and second write operations involve writing data to memory corresponding to a first and a second destination pixel area in the image.

6. The method of claim 5 wherein the first source pixel area has identical dimensions as the first destination pixel area, and wherein the second source pixel area has identical dimensions as the second destination pixel area.

7. The method of claim 5 wherein each of the first source pixel area, first destination pixel area, second source pixel area, and second destination pixel area has a rectangular shape.

8. The method of claim 1 wherein the determining step comprises maintaining a list of data operations, including the first data operation, for which a read operation has started but a write operation has not completed, and determining whether data associated with any data operation in the list of data operations overlaps with data associated with the second data operation.

9. An apparatus for modifying data in memory associated with an image comprising:
  a memory buffer;
  a pipeline operatively coupled to the memory buffer for processing tasks associated with a plurality of data operations affecting data stored in a portion of memory in the memory buffer corresponding to the image, the plurality of data operations including a first data operation involving a first read operation followed by a first write operation and a second data operation involving a second read operation followed by a second write operation, wherein each of the first data operation and the second data operation is a BLIT operation; and
  a controller operatively coupled to the pipeline, wherein the controller is configured to:
    divide the first read operation into a first set of read sub-operations, wherein each read sub-operation reads a subset of data associated with the first read operation, wherein a size of the subset of data associated with each of the first set of read sub-operations is determined at least in part by read granularity of the memory, write granularity of the memory or a combination thereof, and wherein the first write operation further comprises writing the subset of data read by each read sub-operation of the first set of read sub-operations, wherein the controller is further configured to translate the coordinates of the destination pixel area associated with the first write operation to a first range of memory addresses and translate the source pixel area associated with the second read operation to a second range of memory addresses, and wherein an overlap occurs if the first range of memory addresses overlaps the second range of memory addresses;
    divide the second read operation into a second set of read sub-operations, wherein each read sub-operation reads a subset of data associated with the second read operation, wherein a size of the subset of data associated with each of the second set of read sub-operations is determined at least in part by read granularity of the memory, write granularity of the memory or a combination thereof, and wherein the second write operation further comprises writing the subset of data read by each read sub-operation of the second set of read sub-operations;
    start the first read operation, wherein starting the first read operation further comprises:
      inserting the first set of read sub-operations into the graphics pipeline; and
      beginning execution of at least one read sub-operation from the first set of read sub-operations;
    determine whether data associated with the first data operation overlaps with data associated with the second data operation, wherein the controller is further configured to determine whether a destination pixel area associated with the first write operation overlaps with a source pixel area associated with the second read operation;

instruct the pipeline to start the second read operation after the first write operation is completed, if data associated with the first data operation overlaps with data associated with the second data operation; and instruct the pipeline to start the second read operation before the first write operation is completed, if the data associated with the first data operation does not overlap with data associated with the second data operation, wherein starting the second read operation further comprises:

inserting the second set of read sub-operations into the graphics pipeline; and beginning execution of at least one read sub-operation from the second set of read sub-operations.

10. The apparatus of claim 9 wherein the controller is capable of determining whether a destination memory range associated with the first write operation overlaps with a source memory range associated with the second read operation.

11. The apparatus of claim 9 wherein the second read operation is started before completion of the first write operation by processing the first read operation and the second read operation in the pipeline.

12. The apparatus of claim 9 further comprising a signal path connected the controller for a feedback signal indicating completion of the first write operation.

13. The apparatus of claim 9 wherein the first and second read operations involve reading data from memory in the memory buffer corresponding to a first and a second source pixel area in the image, and wherein the first and second write operations involve writing data to memory in the memory buffer corresponding to a first and a second destination pixel area in the image.

14. The apparatus of claim 13 wherein the first source pixel area has identical dimensions as the first destination pixel area, and wherein the second source pixel area has identical dimensions as the second destination pixel area.

15. The apparatus of claim 13 wherein each of the first source pixel area, first destination pixel area, second source pixel area, and second destination pixel area has a rectangular shape.

16. The apparatus of claim 9 wherein the controller is capable of maintaining a list of data operations, including the first data operation, for which a read operation has started but a write operation has not completed, and determining whether data associated with any data operation in the list of data operations overlaps with data associated with the second data operation.

17. A system for modifying data in memory associated with an image comprising:

means for processing a plurality of data operations in a pipelined process affecting data stored in a portion memory corresponding to the image, the plurality of data operations including a first data operation involving a first read operation followed by a first write operation and a second data operation involving a second read operation followed by a second write operation, wherein each of the first data operation and the second data operation is a BLIT operation;

means for dividing the first read operation into a first set of read sub-operations, wherein each read sub-operation reads a subset of data associated with the first read operation, wherein a size of the subset of data associated with each of the first set of read sub-operations is determined at least in part by read granularity of the memory, write granularity of the memory or a combination thereof, and wherein the first write operation further comprises writing the subset of data read by each read sub-operation of the first set of read sub-operations;

means for dividing the second read operation into a second set of read sub-operations, wherein each read sub-operation reads a subset of data associated with the second read operation, wherein a size of the subset of data associated with each of the second set of read sub-operations is determined at least in part by read granularity of the memory, write granularity of the memory or a combination thereof, and wherein the second write operation further comprises writing the subset of data read by each read sub-operation of the second set of read sub-operations;

means for starting the first read operation, wherein the means starting the first read operation further comprises:

means for inserting the first set of read sub-operations into the graphics pipeline; and means for beginning execution of at least one read sub-operation from the first set of read sub-operations;

means for determining whether data associated with the first data operation overlaps with data associated with the second data operation, wherein the means for determining further comprises means for determining whether a destination pixel area associated with the first write operation overlaps with a source pixel area associated with the second read operation, wherein means for determining whether an overlap occurs includes means for translating the coordinates of the destination pixel area associated with the first write operation to a first range of memory addresses and means for translating the source pixel area associated with the second read operation to a second range of memory addresses, and wherein an overlap occurs if the first range of memory addresses overlaps the second range of memory addresses;

means for starting the second read operation after the first write operation is completed, if data associated with the first data operation overlaps with data associated with the second data operation; and means for starting the second read operation before the first write operation is completed, if the data associated with the first data operation does not overlap with data associated with the second data operation, wherein means for starting the second read operation further comprises:

means for inserting the second set of read sub-operations into the graphics pipeline; and means for beginning execution of at least one read sub-operation from the second set of read sub-operations.

18. A electronic device with graphical display output comprising:

a display device;

a processor;

a graphics processing unit coupled to the display device and configured to receive one or more graphics processing instructions from the processor and to output data to the display device in response to the one or more graphics processing instructions, the first graphics processing unit including:

a graphics processor, configured to execute a plurality of data operations in response to the one or more graphics processing instructions received from the processor;

a memory buffer;

a pipeline operatively coupled to the memory buffer for processing tasks associated with a plurality of data operations affecting data stored in a portion of memory in the memory buffer corresponding to the image, the plurality of data operations including a first data operation involving a first read operation followed by a first write operation and a second data operation involving a second read operation followed by a second write operation, wherein each of the first data operation and the second data operation is a BLIT operation; and a controller operatively coupled to the pipeline, wherein the controller is configured to:

divide the first read operation into a first set of read sub-operations, wherein each read sub-operation reads a subset of data associated with the first read operations wherein a size of the subset of data associated with each of the first set of read sub-operations is determined at least in part by read granularity of the memory, write granularity of the memory or a combination thereof, and wherein the first write operation further comprises writing the subset of data read by each read sub-operation of the first set of read sub-operations;

divide the second read operation into a second set of read sub-operations, wherein each read sub-operation reads a subset of data associated with the second read operation, wherein a size of the subset of data associated with each of the second set of read sub-operations is determined at least in part by read granularity of the memory, write granularity of the memory or a combination thereof, and wherein the second write operation further comprises writing the subset of data read by each read sub-operation of the second set of read sub-operations;

start the first read operation, wherein starting the first read operation further comprises:

inserting the first set of read sub-operations into the graphics pipeline; and beginning execution of at least one read sub-operation from the first set of read sub-operations;

determine whether data associated with the first data operation overlaps with data associated with the second data operation, wherein the controller is further configured to determine whether a destination pixel area associated with the first write operation overlaps with a source pixel area associated with the second read operation, wherein the controller is further configured to translate the coordinates of the destination pixel area associated with the first write operation to a first range of memory addresses and translate the source pixel area associated with the second read operation to a second range of memory addresses, and wherein an overlap occurs if the first range of memory addresses overlaps the second range of memory addresses;

instruct the pipeline to start the second read operation after the first write operation is completed, if data associated with the first data operation overlaps with data associated with the second data operation; and instruct the pipeline to start the second read operation before the first write operation is completed, if the data associated with the first data operation does not overlap with data associated with the second data operation, wherein starting the second read operation further comprises:

inserting the second set of read sub-operations into the graphics pipeline; and beginning execution of at least one read sub-operation from the second set of read sub-operations.

\* \* \* \* \*